Figure 1:
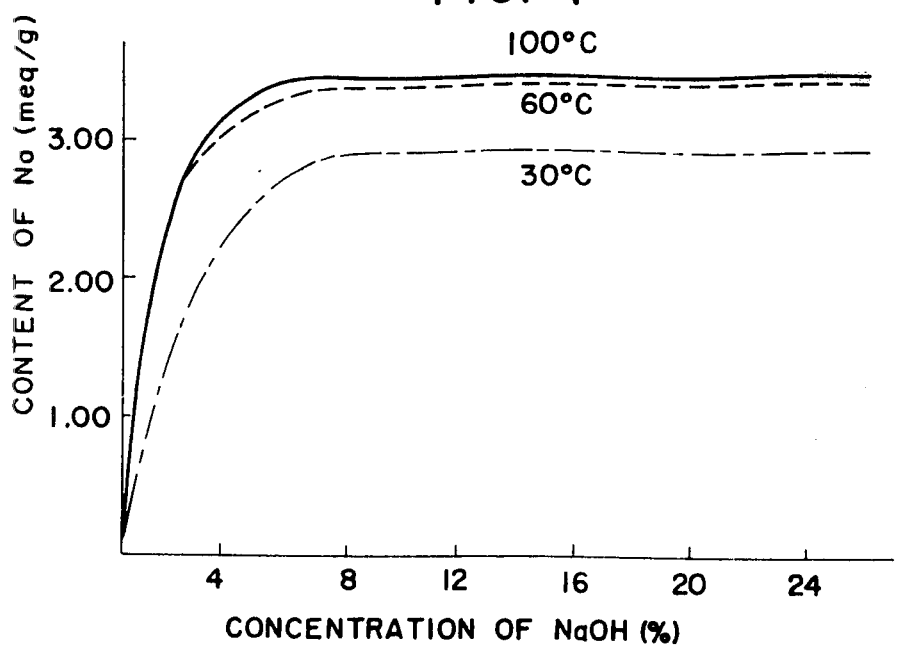

United States Patent [19]
Tominaga et al.

[11] 3,948,791
[45] Apr. 6, 1976

[54] ION EXCHANGER AND METHOD FOR THE PRODUCTION THEREOF

[75] Inventors: Mitsuharu Tominaga, Tokyo; Mamoru Mimori, Funabashi; Kinnosuke Okuda, Ichikawa, all of Japan

[73] Assignee: Japan Metals and Chemicals Co., Ltd., Tokyo, Japan

[22] Filed: Aug. 20, 1973

[21] Appl. No.: 389,445

[30] Foreign Application Priority Data
Aug. 23, 1973 Japan............................ 48-84378

[52] U.S. Cl. ................ 252/179; 210/40; 252/193; 423/181
[51] Int. Cl.² ...................... B01D 15/00; B01J 1/04
[58] Field of Search................. 252/179, 193, 8.55; 423/181, 24; 210/39, 40

[56] References Cited
UNITED STATES PATENTS
2,312,449  3/1943  Shoemaker........................ 252/179
2,693,452  11/1954  Goedkoop......................... 252/179

Primary Examiner—Mayer Weinblatt
Assistant Examiner—Edith R. Buffalow
Attorney, Agent, or Firm—Stevens, Davis, Miller & Mosher

[57] ABSTRACT

An ion exchanger consisting of crushed lignite or brown coal retaining alkali ions, which is obtained by immersing the particles in a dilute caustic alkali solution. The concentration of the caustic alkali ranges from 2 to 20 weight percent, preferably from 3 to 10 weight percent. Following the treatment with the alkali, the system is washed with an acid with a pH of 3 to 7 to remove the alkali liquid. The resultant lignite has less than 4 meq/g, for instance 2.60 to 3.50 meq/g, of sodium ions and exhibits abilities of ion exchange. By treating the alkali treated lignite with hydrochloric acid or sulfuric acid it is possible to retain hydrogen ions, and by using a solution of a calcium salt such as calcium chloride calcium ions can be retained. Thus, calcium ions or potassium ions may be exchanged with cations of a salt of metal of Group second in the periodic table such as calcium, magnesium, barium and zinc.

2 Claims, 8 Drawing Figures

TYPICAL FLOWSHEET OF AMMONIUM TREATMENT PROCESS

RELATIONSHIP BETWEEN CONCENTRATION OF CAUSTIC SODA AND SODIUM CONTENTS OF TREATED LIGNITE

RELATIONSHIP BETWEEN SODIUM CONTENTS OF TREATED LIGNITE AND ABSORBED QUANTITY OF METAL IONS

SODIUM CONTENTS ABSORBED IN LIGNITE PARTICLES

CONVERSION BEHAVIOR FROM SODIUM TO MAGNESIUM IN LIGNITE

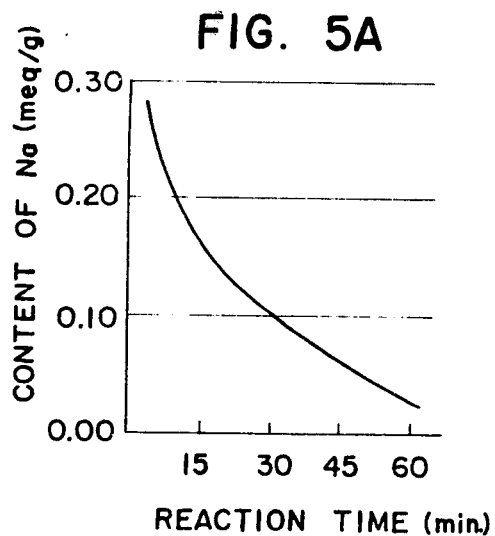
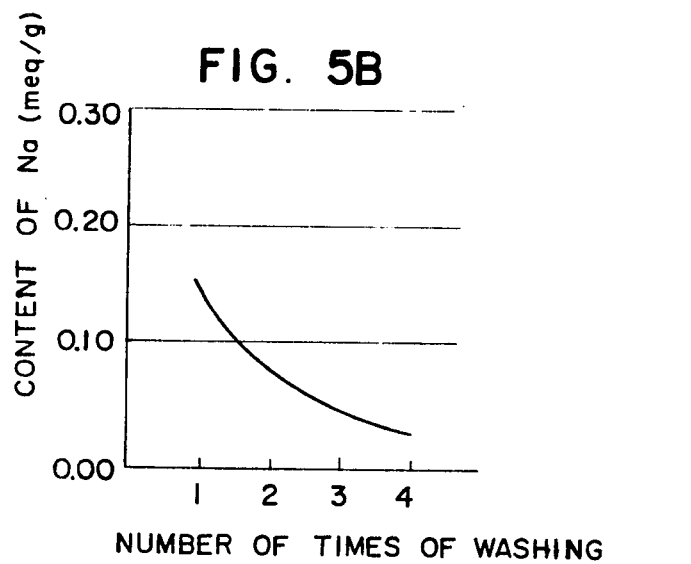
RELATIONSHIP BETWEEN Na₂O REMAINED IN LIGNITE
AND (A) TIME OF CONVERSION REACTION;
AND (B) NUMBER OF TIMES OF WASHING

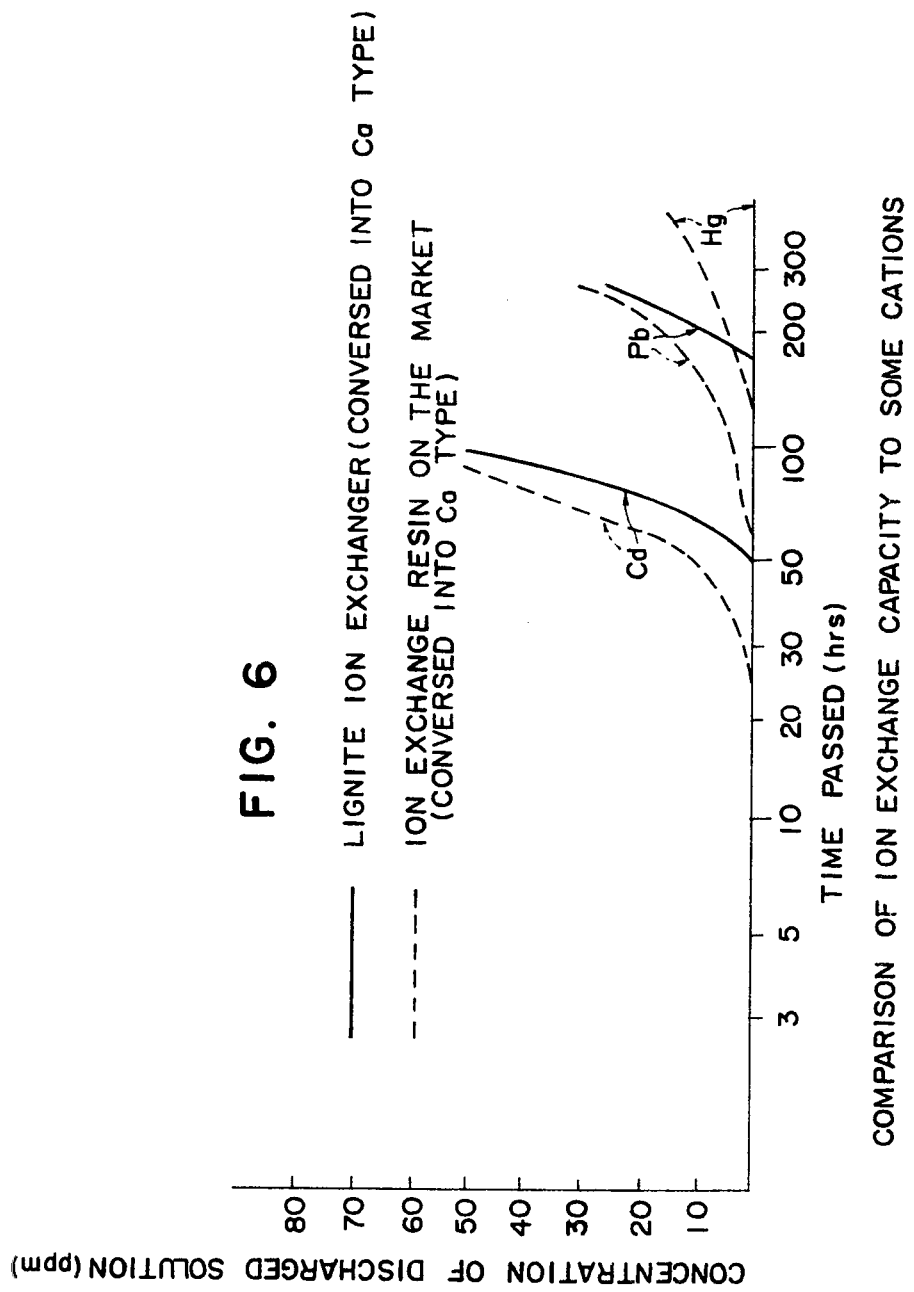

EFFECT OF SOME AMMONIACAL SOLUTION CONTAINING CoCl2 TO BEAR Co ION INTO LIGNITE (1) CoCl2 aq· pH=7
(2) CoCl2, NH4Cl, NH4OH aq. pH=9.5
(3) CoCl2, NH2OH.HCl, NaOH aq. pH=7.0

TYPICAL FLOWSHEET OF AMMONIUM TREATMENT PROCESS

ION EXCHANGER AND METHOD FOR THE PRODUCTION THEREOF

The present invention relates to ion exchanger having a cation of first group or second group of periodical table and relates to method for the production them from lignite or brown coal.

Ion exchangers are known as zeolite, ion exchange resin or others. In these ion exchangers, ion exchange resin is most effective and zeolite or others have less ability of ion exchange. But ion exchange resin is very expensive and so it is not available in industrial treatment of water pollution.

It is an object of this invention to provide an ion exchanger having excellent abilities of ion exchange with respect to heavy metal ions.

It is another object of the invention to provide a method of manufacturing an ion exchanger consisting of crushed lignite carrying cations.

It is a further object of the invention to provide a method of converting an ion exchanger consisting of lignite carrying sodium or potassium ions into a salt of metal of Group II in the periodic table.

Lignite or brown coal has much porosity in grain structure and it shows a little ion adsorption in solution. But this adsorption is essentially physical and not ion exchange phenomenon. The inventors have attention to porous structure of lignite or brown coal and attempt to make them sustain a kind of cations available in use of disposal water.

Coal is classified in various ways in all countries and some countries distinguish lignite from brown coal and others not. In this invention, we do not distinguish lignite from brown coal and we use a term "lignite", including brown coal. Characteristic of coal are shown as chemical analysis of materials and some of them are as fixed carbon, volatile matter and ash. When we use a ratio of fixed carbon and volatile matter as a parameter, that of lignite above mentioned is smaller than 1.8 and it is commonly 1.0 ±0.4.

Lignite was crushed and sieved in size of no greater than 5mm. The crushed material was leached in dilute caustic alkaline solution with or without heat. Under this treatment, lignite kept its hard shell and sustained alkaline ion in its shell. When concentrated caustic alkaline solution is used, the lignite will be destroyed and its hard shell will collapse. For this reason, dilute caustic alkaline solution such as 2 ~ 20 weight percent, preferably from 3 to 10 weight percent, of caustic soda or caustic potash is available to be sustained with sodium or potassium ion. Sodium carbonate or potassium carbonate is also suitable for leaching reagent. The alkaline leached lignite was nextly washed by acid solution in pH of 3 ~ 7. The object of this acid washing is to remove adhered alkaline solution. The resulted lignite, for instance, contained 0.01 ~ 4meq/g, preferably from 2.60 ~ 3.50meq/g, of sodium and this sodium ion showed ion exchange capacity. Hydrogen-containing ion exchanger is obtained when hydrochloric acid or sulfuric acid is used to treat alkaline treated lignite. Calcium-containing ion exchanger is obtained when calcium salt is added into the alkaline treated ion exchanger. Other types of ion exchanger are also obtained by using metal salt as solid or liquid.

FIG. 1 diagrammatically illustrates of a relationship between concentration of caustic soda and sodium contents of treated lignite.

Figure 2:
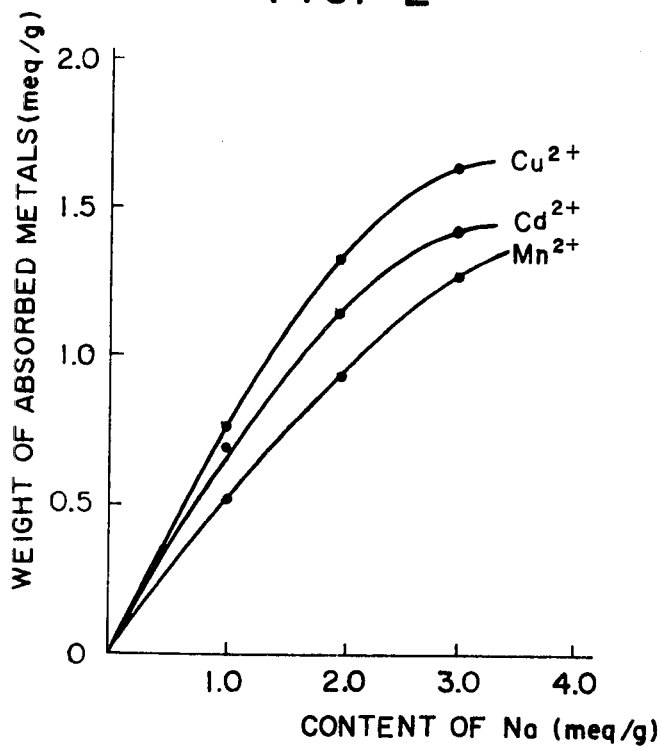
Figure 3:
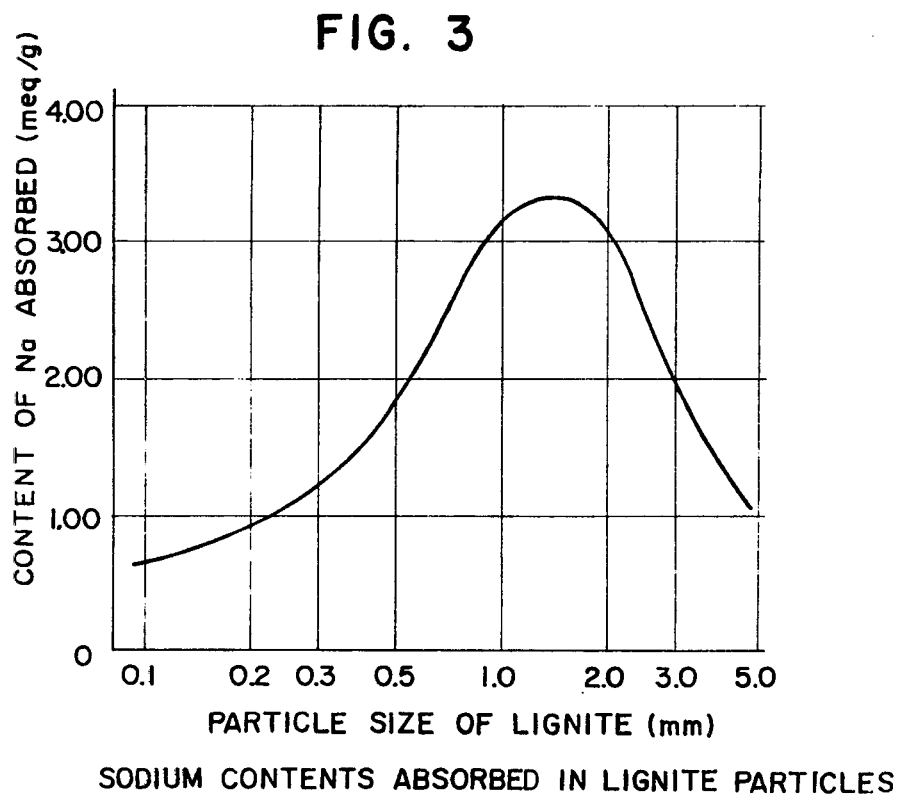
Figure 4:
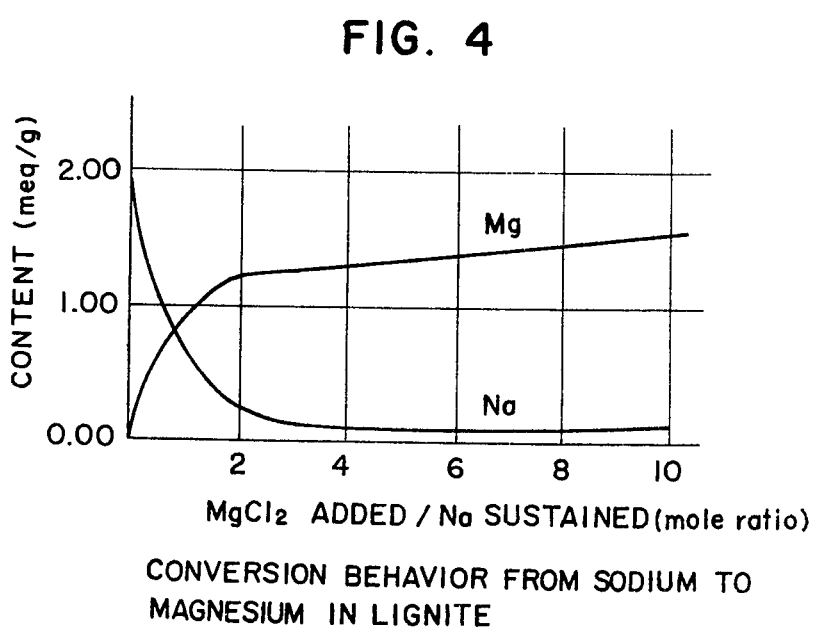
Figure 7:
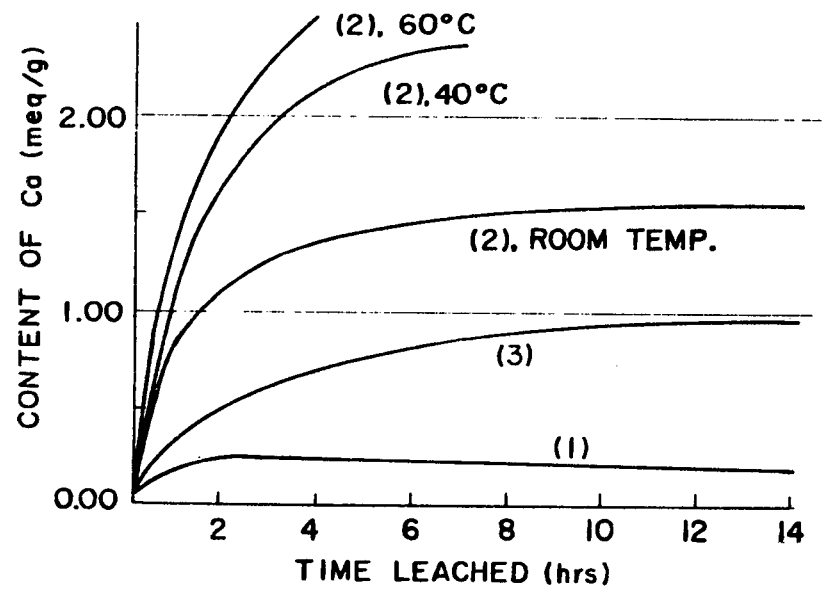
Figure 8A:
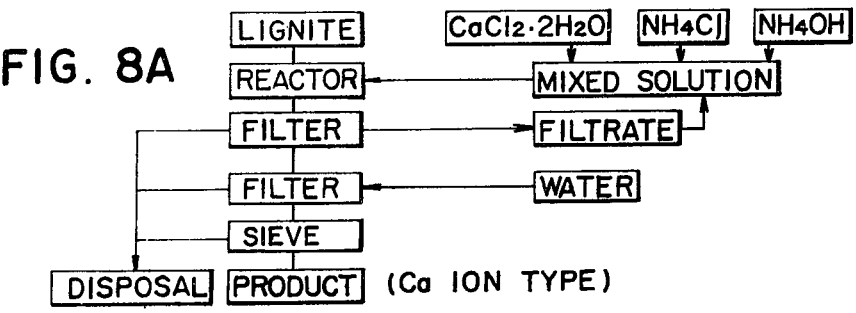
Figure 8B:
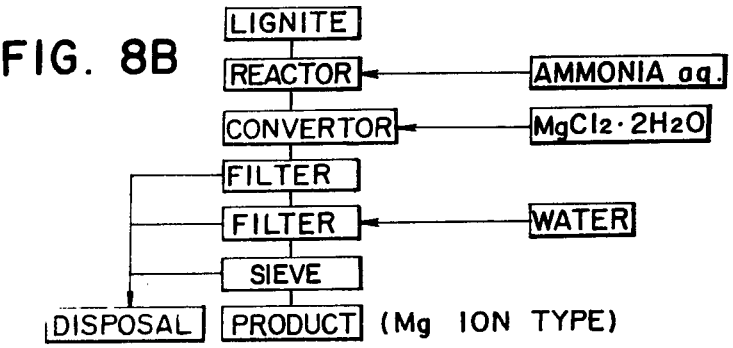
Figure 8C:
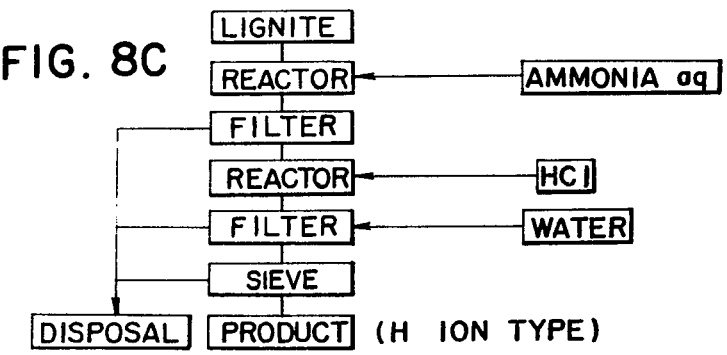

FIG. 2 diagrammatically illustrates of a relationship between sodium contents of treated lignite and absorbed quantity of metallic ions, FIG. 3 diagrammatically illustrates of a relationship between particle size of lignite and sodium content in each sizes of lignite, FIG. 4 diagrammatically illustrates of a behavior of cenversion from sodium to magnesium in the lignite, FIG. 5 diagrammatically illustrates of a relationship between time of leaching or number of times of washing and sodium oxide remained, FIG. 6 diagrammatically illustrates of a comparison of the lignite ion exchanger to ion exchange resin on the market in relation to dynamic adsorption of solution containing cadmium, lead and mercury, FIG. 7 diagrammatically illustrates of a effects of ammoniacal calcium solution to bear calcium ion into lignite, and;

FIG. 8 diagrammatically illustrates of a typical flow-sheet of ammonium treatment process.

FIG. 1 shows a relationship between the concentration of caustic soda and sodium content of treated lignite. This lignite was crushed and sieved in size 1.65 ~ 0.55mm and treated with 1 ~ 25wt% caustic alkaline solution at 30°C, 60°C and 100°C for one hour. Afterwards lignite was washed by 3wt% hydrochloric acid in pH 4.0 ~ 4.5. FIG. 1 indicates that the maximum sodium content is 3.50meq/g and that concentration of caustic soda is sufficient to be under 20wt%.

The treated lignite above mentioned exchanges its sodium ion to cadmium, copper or manganese ion.

FIG. 2 shows these conversion.

FIG. 3 shows relationship between particle size of lignite and sodium content of each sizes of lignite. The sizes were treated with 3wt% caustic soda at 60°C for one hour and was washed with 3wt% hydrochloric acid in pH 3. FIG. 3 indicates no greater than 5mm of lignite contains sufficient quantity of sodium ion.

The alkaline treated lignite containing some percent of sodium ion shows ion exchange ability and this ability concerns to pH of acid washing process. Table I shows ion exchange capacity of treated lignite. The invented lignite ion exchanger is excellent to heavy metal ions such as manganese, copper, cadmium, nickel and cobalt.

Table I

| Sample | pH of the last process | Content of Na, (meq/g) | Color of treated solution | Absorbed quantity of metallic ion, (meq/g) | | | | |
|---|---|---|---|---|---|---|---|---|
| | | | | $Mn^{2+}$ | $Cu^{2+}$ | $Cd^{2+}$ | $Ni^{2+}$ | $Co^{2+}$ |
| Alkaline treated | 9.2 | 2.53 | Dark brown | 0.39 | 0.36 | 0.27 | 0.31 | 0.30 |
| Water-washed successively Acidified | 7.0 | 1.60 | Light brown Light | 0.93 | 0.77 | 0.72 | 0.83 | 0.78 |

Table I-continued

| Sample | pH of the last process | Absorbed quantity of metallic ions by alkaline treated lignite | | Absorbed quantity of metallic ion, (meq/g) | | | | |
| --- | --- | --- | --- | --- | --- | --- | --- | --- |
| | | Content of Na,(meq/g) | Color of treated solution | $Mn^{2+}$ | $Cu^{2+}$ | $Cd^{2+}$ | $Ni^{2+}$ | $Co^{2+}$ |
| successively | 7.5 | 1.75 | brown | 0.85 | 0.68 | 0.64 | 0.77 | 0.72 |
| " | 6.5 | 1.71 | Yellow | 1.53 | 1,37 | 0.98 | 1.70 | 1.39 |
| " | 4.0 | 1.67 | None | 1.51 | 1.34 | 0.95 | 1.62 | 1.32 |
| " | 2.5 | 0.00 | None | 0 | 0 | 0 | 0 | 0 |
| Original lignite | 6.0 | 0.17 | None | 0 | 0.05 | 0 | 0 | 0 |
| Sulfonized coal | — | — | — | 0.15 | 0.39 | 0.25 | 0.17 | 0.12 |

Table I also shows that pH of the process must not be under 2.5 and that color of the treated solution is dense if pH is to alkaline. The most desirable range of pH is 3 ~ 7.

The most important use of this lignite ion exchanger is to remove heavy metal ions from industrial disposal. The industrial disposal water contains many sorts of ions such as potassium, sodium, calcium, magnesium and others. But detrimental ions to human health are a few sorts. In the present pollution problems, mercury and cadmium are most detrimental. Lead ion comes after. In a actual disposal, these most detrimental ions are rarely coexisted and so we must remove selectively a sort of ions such as mercury or cadmium. Another problem of an actual treatment is pH of disposal water. In most cases of industrial disposal, pH range of disposal water is 4 ~ 10 and 6.0 ~ 8.5 is desirable. These two points, that is selective adsorption of a detrimental ion and pH of disposal water, need to convert alkaline ion into alkaline earth ion or zinc ion such as shown second group cations in Mendeleiev's periodical table.

For example, we describe selectivity of magnesium-containing lignite ion exchanger. Synthesized test solution had complicated constituents as follows.

| Concentration of manganese | 21.0 | ppm |
| --- | --- | --- |
| Concentration of calcium | 41.6 | ppm |
| Concentration of magnesium | 25.7 | ppm |
| Concentration of sodium | 130.0 | ppm |
| Concentration of potassium | 204.0 | ppm |

Lignite ion exchanger containing 3.00meq/g magnesium ion was filled into a column having 17mm in diameter and 200mm in length. The test solution above mentioned was passed through the column at space velocity, 20/Hr. and in pH 5.7. After one hour, concentration of discharged solution was as follows;

| Potassium | 204.0 | ppm |
| --- | --- | --- |
| Sodium | 130.0 | ppm |
| Magnesium | 80.2 | ppm |
| Calcium | 3.1 | ppm |
| Manganese | 0.3 | ppm |

In this analysis we can understand of selectivity; potassium and sodium take no part of ion exchange. After 18 hours, concentration of discharged solution was as follows;

| Potassium | 204.0 | ppm |
| --- | --- | --- |
| Sodium | 130.0 | ppm |
| Magnesium | 20.3 | ppm |
| Calcium | 41.6 | ppm |
| Manganese | 10.3 | ppm |

The data indicate that magnesium first absorbed manganese and calcium ions and that consequently lignite is converted into calcium-containing exchanger. For this reason, the calcium-containing lignite is reasonable to remove manganese ion from the test solution.

Cation converted from alkaline ion of lignite exchangers are desirable to be hydrogen ion or second group cations in Mendeleiev's periodic table, especially calcium, magnesium, barium or zinc ion.

The conversion process is simple. Hydrogen-containing ion exchanger is obtained when hydrochloric acid or sulfuric acid is used to treat alkaline treated lignite. Calcium-containing ion exchanger is obtained when calcium salt is added into the alkaline treated ion exchanger. Other types of ion exchanger are also obtained by using metal salt as solid or liquid. In practical purposes, metal chloride crystal or its solution is most available.

As an example, we produced magnesium-containing lignite exchanger. This was obtained by adding 25wt% magnesium chloride solution into alkaline treated lignite and by washing with water repeatedly.

FIGS. 4 and 5 show that a little quantity of alkaline remains in final products and that its quantity is less when time of conversion is longer or when number of times of washing is more. In practical procedure, conversion reaction is done for 10 ~ 60min and 2 ~ 5 times of washing is necessary. The resulted ion exchanger is available to remove manganese, cadmium, mercury, nickel, copper or lead ion selectively from industrial disposal water.

In FIG. 6, we compared calcium-containing lignite with ion exchange resin on the market. The latter was treated with calcium chloride solution to result calcium content of 3.40meq/g. Calcium content of the lignite was 2.30meq/g. 150ml of each was filled into column of 31mm in diameter and of 500mm in length. Water solution containing 100 ppm of mercury was led into the column at space velocity 5/Hr.

FIG. 6 shows also in case of cadmium and lead whose treatment are the same condition as the case of mercury. The figure indicates that the lignite ion exchanger invented is superior to ion exchange resin.

As we described in detail on behavior of lignite ion exchanger with respect to its production method, one can understand that the first step of treatment, that is alkaline leaching process, is dominant over the capacity of ion exchange later. We experienced that sodium content remained in lignite after the first step was up to 4meq/g. Therefore, the effective content of cation of synthesized lignite ion exchanger is also up to 4meq/g of each elements.

Ammonia leaching is also able to adopt in the first step in stead of caustic alkaline treatment. The Japanese lignite was crushed in size of no greater than 5mm and 20g of it was leached in ammonia solution of various concentration at 40°C for one hour. 5.3g of calcium chloride and 5g of ammonium chloride were added into the solution and after 2 hours lignite was filtered, washed and dried. The concentration of ammonia solution and calcium content of lignite in each sizes are shown in Table (II). Ion exchange capacity of lignite are also shown. Another experiment was done with lignite in size of 5 ~ 10mm under the same condition above, and we got calcium content of 0.5meq/g. This indicates that lignite over 5mm is not available in ion exchange usage.

colored disposal. Therefore, the most desirable pH is in range of 8.5 ~ 9.5. The results and conclusions of Table (II) and FIG. 3 were the same in case of other second group cations of periodic table, such as magnesium, barium or zinc. Concentration of cation to be converted is higher, the procedure is more convenient. The conversion solution can be used again if absorbed quantity of cation is supplied. Some typical flowsheet of ammonium treatment are shown in FIG. 8.

We describe how to regenerate the lignite ion exchanger. Cation absorbed in the lignite ion exchanger was easily stripped by acid solution. After stripping, the lignite has hydrogen ion. When cation-containing ammonia solution passes through the lignite, hydrogen ion can be easily converted to another cation. The cation-containing ammonia solution is typically represented as $CaCl_2 - NH_4Cl - NH_4OH$ aq. The regeneration procedure was done in column and in vessel. The regener- Table (II)

| Volume of 28% $NH_4OH$ contained in 100 ml of leached solution | Calcium contents and ion exchange capacities of ammonia-treated lignite, (meq/g) | | | | | |
|---|---|---|---|---|---|---|
| | Calcium content in each classes | | | Ion exchange capacity to manganese ion in each classes | | |
| | 5~2mm | 2~0.5mm | 0.5~0mm | 5~2mm | 2~0.5mm | 0.5~0mm |
| 1.5 ml | 1.50 | 1.74 | 1.80 | 1.46 | 1.73 | 1.79 |
| 3.1 ml | 1.56 | 1.78 | 1.89 | 1.55 | 1.76 | 1.86 |
| 6.1 ml | 1.51 | 1.95 | 2.02 | 1.49 | 1.93 | 2.02 |
| 18.4 ml | 1.78 | 1.76 | 1.88 | 1.74 | 1.74 | 1.83 |
| 30.7 ml | 1.64 | 1.76 | 1.72 | 1.62 | 1.68 | 1.72 |
| 61.5 ml | 1.69 | 1.84 | 1.77 | 1.68 | 1.81 | 1.75 |

In the Table (II), we got a result that calcium content of lignite was independent to quantity of ammonia solution added. This suggests that calcium conversion process will proceed easily if pH of leaching solution is basic. We attemped to get final lignite ion exchanger in the first stage of alkaline treatment with coexistence of metallic salt solution. The result is shown in FIG. 7.

Three types of calcium chloride solution were used. Their constituents, pH and concentration of calcium were as follows;

| No. | Constituents | pH | Conc. of Ca, ppm |
|---|---|---|---|
| 1 | Calcium chloride aq. | 7.0 | 1411 |
| 2 | $CaCl_2$, $NH_4Cl$, $NH_4OH$ aq. | 9.5 | 1388 |
| 3 | $CaCl_2$, $NH_2OH \cdot HCl$, NaOH aq. | 7.0 | 1502 |

Lignite was crushed and sieved in size of 2 ~ 0.5mm. Five grams of the lignite was leached in a vessel with 500ml of a sort of the above mentioned solution at room temperature, 40°C, 60°C for 0.5 ~ 14 hours.

FIG. 7 indicates that No. 2 solution is the best and that temperature of reaction is higher, the reaction occurs more rapidly. FIG. 7 also indicates that No. 3 type of solution is more effective than No. 1 type of solution in pH 7. Considering the results of Table (II) which was done in pH 8 ~ 11, it is resonable to understand that the ammonium treatment on pH 7 ~ 11 is available to get calcium-containing lignite ion exchanger in the simplest way. When the solution is heated, vaporization of ammonium occurs. As this makes pH of solution lower, a vessel must be sealed to let vapors return. When pH of solution is lower than 8.5, the rate of conversion reaction is slow. When pH of solution is high than 9.5, there seems tendency to dissolve humic acid of the lignite into solution, resulting ation process did not need heating and the capacity equal to the original ion exchanger was obtained.

The following examples are included merely to aid in the understanding of the invention, and variations may be made by one skilled in the art without departing from the spirit and scope of the invention.

EXAMPLE 1

Japanese lignite, whose fixed carbon and volatile matter are 48.2 and 44.5 wt% respectively, was crushed and sieved in 1.65~0.5mm. To 100g of the lignite, 500ml of 3 wt% NaOH solution was added and they were heated at 60°C for one hour. After filtering, the lignite was put in a 500 milliliter beaker and was washed five times using 500ml of water every time. Afterwards the lignite was acidified with 3 wt% HCl solution with adding water to make pH 3.0. Filtration and washing were repeated and we got 102g of lignite ion exchanger. The product was filled in a column of 3cm in diameter. 10 ppm cadmium-containing solution passed through the column at 50ml/min. After one hour, the discharged solution was analysed by atomic absorption photometry and no cadmium ion was detected.

EXAMPLE 2

Australian lignite, whose fixed carbon and volatile matter are 45.1 wt% and 52.9 wt% respectively, was used. Size of the lignite used was 3.96~0.30mm and weight of offerd was 1Kg. 5 liters of 8% $Na_2CO_3$ solution was added to the lignite and they were heated at 80°C for one hour. After sieving with 50 meshsieve, the oversize was washed five times using 5 liters of water each time. Afterwards 8 wt% HCl was added with 5 liters of water to make pH 3.0. The resulted lignite ion exchanger was filled in a column and 30 ppm $MnSO_4$ solution was charged at 5 liters per hour. Concentration of manganese ion in discharged solution was determined. On the other hand, active carbon on the market was filled in a column and its adsorption of manganese ion was examined in the same manner and under the same condition as the case of lignite ion exchanger. Both results were as follows;

| Passed time (min) | Concentration of $Mn^{2+}$ in discharged solution, ppm | |
|---|---|---|
| | Lignite ion exchanger | Active carbon |
| 10 | 0 | 0 |
| 20 | 0 | 0.90 |
| 30 | 0 | 2.22 |
| 60 | 0 | 3.15 |
| 120 | 0.02 | 4.02 |

EXAMPLE 3

Japanese lignite was used. It has 35.9 wt% of fixed carbon and 49.1 wt% of volatile matter. 50Kg of the crushed lignite was leached in 150 liters of water with 8Kg of NaOH. The mixture was heated at 80°C for one hour. After filtering and washing, lignite was acidified with 5 wt% HCl to make pH 3.5. Afterwards 50Kg of $CaCl_2.2H_2O$ was added. The mixture was held for 30 min at room temperature. The resulted lignite held 2.50~3.10 meq/g of calcium. One gram of the product was capable to exchange 2.47~3.10 meq/g of manganese ion.

EXAMPLE 4

Japanese lignite was treated with NaOH and HCl in the same manner as example 3. After adjusting pH to 3.5, 50Kg of $MgCl_2$ was added. The mixture was held for 60 min. The resulted lignite contained 3.50 meq/g of magnesium. The product was filled in a column and examined in dynamical feature. Mixed solution consisting of 21 ppm of manganese, 204 ppm of sodium and 130 ppm of potassium was used. After passing the lignite, concentration of each ions of discharged solution was measured during 4 hours. The result was as follows;

| Concentration (ppm) | Time passed (hr) | | |
|---|---|---|---|
| | Start | 2 | 4 |
| sodium | 204 | 204 | 204 |
| Potassium | 130 | 130 | 130 |
| Manganese | 21 | 0.1 | 0.1 |

EXAMPLE 5

Japanese lignite was treated with NaOH and HCl in the same manner as example 3. After adjusting pH to 3.5, 50Kg of $ZnCl_2$ was added. The mixture was heated for 20 min. The lignite obtained contained 3.20 meq/g of zinc. The dynamical feature of the lignite ion exchanger was as follows;

| Concentration (ppm) | Time passed (hr) | | |
|---|---|---|---|
| | Start | 2 | 4 |
| zinc | 200 | 200 | 200 |
| mercury | 30 | 0 | 0 |

EXAMPLE 6

Lignite containing 42.8 wt% of fixed carbon and 46.1 wt% of volatile matter was used. The lignite was crushed under 5mm. 1Kg of crushed lignite was leached in 5 liters of ammonia solution with pH 9.5 at 40°C. After 2 hours, HCl was added to acidify and pH was 1.0. The resulted lignite contained hydrogen ion and yield was 96%. The lignite ion exchanger was crushed under 100 mesh and the powdered sample was leached in 2,000 ppm of calcium acetate solution at pH 9.0 for 24 hours. Capacity of the lignite ion exchanger was 2.98 meq/g.

EXAMPLE 7

2Kg of lignite containing 45 wt% of water was crushed and sieved in size of 2 ~ 0.5mm. The lignite was leached in 7 liters of ammonia at pH 7.5 and held for one hour at 60°C. Afterwards 1Kg of $CaCl_2.2H_2O$ powder was immediately added to the ammonia solution. After 30 min, the lignite was sieved by 0.5mm-sieve and washed two times with 5 liters of water. The filtrate showed slightly turbid but suspension precipitated immediately. The supernatant liquid was clear. lignite contained 2.93 meq/g of calcium and it was capable to exchange 3.12 meq/g of cadmium ion at 30°C for 24 hours.

EXAMPLE 8

1Kg of Australian lignite was crushed no greater than 5mm. It was put into a vessel having a reflux condenser and leached with 4 liters of ammonia solution at pH 9.5. The mixture was heated to 40°C and held for 4 hours. After cooling, 3 liters of 30 wt% $MgCl_2$ solution was added into the vessel and settled for 5 hours. Using 2mm and 5mm-sieves, three fractions of lignite were obtained. Each fractions was washed two times with 1 liter of water and dried at 100°C. Weight recovered, content of magnesium and ion exchange capacity of each fractions were as follows;

| | Fraction of size (mm) | | |
|---|---|---|---|
| | 5~2mm | 2~0.5mm | 0.5~0mm |
| Weight (Kg) | 0.30 | 0.57 | 0.12 |
| Content of Mg (meq/g) | 1.70 | 2.25 | 2.34 |
| Ion exchange capacity (to Mn ion, meq/g) | 1.65 | 2.21 | 2.33 |

EXAMPLE 9

Japanese lignite was crushed no greater than 2mm. 2.5Kg of the lignite was leached in following mixed solution: 500g of $ZnCl_2$, 100g of $NH_4Cl$ and 1 liter of 28 wt% ammonia. The mixture was made up to 10 liters with water. A leaching vessel was stainless steel and had a reflux condenser. The mixture was heated to 60°C and held for 5 hours. After cooling to room temperature, the products were sieved by 0.5mm-sieve. Afterwards the products were washed with 5 liters of water and dried at 100°C. A fraction of 2~0.5mm was 1.53Kg and a fraction of no greater than 0.5mm was 1.1Kg. Content of zinc was 2.65 and 2.80 meq/g respectively. Ion exchange capacity to mercury ion at 30°C for 24 hours was 2.70 and 2.88 meq/g respectively.

EXAMPLE 10

Calcium-containing lignite ion exchanger obtained in example 7 was leached in 10 wt% $MnCl_2$ solution for 24 hours to convert calcium ion to manganese ion. The resulted lignite contained 2.92 meq/g of manganese. The wet lignite was filled in a column being 33mm in diameter and 500mm in height. Height of lignite layer was 200mm and its volume was 170ml. HCl (1 to 9) passed through the column at specific velocity 10/hr. After passing water, mixed solution of 20 wt% $CaCl_2.2H_2O$, 5 wt% $NH_4Cl$ and ammonia passed. pH of mixed solution was 9.5 and its space velocity was 5/hr. After 2 hours washing was done with water for 10 min.

Afterwards the lignite was taken out of the column and its calcium content was measured. Lignite had 3.07 meq/g of calcium. The experiment was repeated and we knew the fact that the higher content of calcium was obtained when time of regeneration was longer.

What we claim is:

1. The method of manufacturing an ion exchanger comprising the steps of crushing lignite into particles with a grain size no greater than 5mm, immersing the particles in an aqueous solution of ammonia at an elevated temperature or normal temperature, and treating the ammonia treated system with an aqueous solution of a salt of a metal in Group II of the periodic table.

2. The method as defined in claim 1, wherein the ammoniacal aqueous solution contains a salt of a metal of Groups I and II of the periodic table.

* * * * *